United States Patent [19]

Bellamy et al.

[11] Patent Number: 5,027,344
[45] Date of Patent: Jun. 25, 1991

[54] INTEGRATED OFFICE CONTROLLER (IOC)

[75] Inventors: John C. Bellamy, Coppell; Richard L. Christensen, Richardson; Charles K. Schroth, both of Richardson, all of

[73] Assignee: Data General Corporation, Westboro, Mass.

[21] Appl. No.: 372,885

[22] Filed: Jun. 28, 1989

[51] Int. Cl.[5] .................................................. H04J 3/00
[52] U.S. Cl. ........................................ 370/56; 370/58.1
[58] Field of Search ........................ 370/56, 58.1, 58.2, 370/58.3, 60, 60.1, 109, 110.1, 112

[56] References Cited

U.S. PATENT DOCUMENTS

| 4,288,870 | 9/1981 | McDonald et al. | 370/56 |
| 4,612,634 | 9/1986 | Bellamy | 370/58.2 |
| 4,689,783 | 8/1987 | Kaczerowski | 370/56 |
| 4,737,950 | 4/1988 | Fechalos | 37/56 |
| 4,833,673 | 5/1989 | Chao et al. | 370/110.1 |

Primary Examiner—Douglas W. Olms
Assistant Examiner—Melvin Marcelo
Attorney, Agent, or Firm—Joseph J. Kaliko; Joel Wall; Jacob Frank

[57] ABSTRACT

An integrated office controller (IOC) network includes, in combination, a plurality of station devices each capable of transmitting and receiving multiplexed bearer and signal channel information; user port interface means for carrying said multiplexed information between a station device and a station multiplex/demultiplex device (SMX); a plurality of SMXs, each associated with and coupled to a predefined cluster of said station devices, via said user port interface means, for concentrating the multiplexed information froms said interface means into channel signals, central equipment module (CEM) means, including a call processor, a non-blocking switch matrix and clock means, for switching channel signals through said switch matrix under the control of said cell processor and clock means; transmission system means, capable of interfacing SMXs and trunk cards to said CEM, where said transmission system means includes modular line interface module (LIM) means for interfacing a plurality of SMXs and the CEM, and modular trunk interface module (TIM) means for interfacing trunks with the CEM; and host processing means, coupled to the CEM, for providing support for standard IOC features and programmable applications. The IOC functions as a digital pulse code modulated (PCM) information handling system for voice, and simultaneous handling of data signal communication between stations serviced by IOC SMX's.

23 Claims, 6 Drawing Sheets

LINE INTERFACE MODULE

TRUNK INTERFACE MODULE

CENTRAL EQUIPMENT MODULE

INTEGRATED OFFICE CONTROLLER (IOC)

BACKGROUND OF THE INVENTION

1. Field of the Invention

The invention relates to communications systems and more particularly to systems for providing simultaneous voice, data and control systems communications.

2. Description of the Related Art

U.S. Pat. No. 4,612,634, issued Sept. 16, 1986 to John Bellamy, assigned to the same assignee as the present invention, describes a communication system that performs as an Integrated Digital Network ("IDN") capable of simultaneous voice, data and control communications throughout the system network. U.S. Pat. No. 4,612,634 is hereby incorporated by reference.

The IDN described in the above referenced patent has a flexible architecture that permits post installation changes in voice, data and control signal distribution and can be installed through telephone interconnect wiring in existing building structures.

The IDN taught in the referenced application includes a matrix switch and a plurality of user ports for exchanging voice, data and control digital signals between the matrix switch and user equipment. The digital signals comprise single samples of each signal type from each user port in each IDN sample time interval.

The IDN further comprises a transmission system for concentrating user port digital signal samples of each sample time interval, by common signal type, into multiple bit channel signals for exchange between the user ports and matrix signal ports of the matrix switch, the matrix switch interconnecting each channel signal from one or more user ports, back through the transmission system to one or more user ports.

The user ports of the IDN include station bearer and signalling channels. The transmission system includes, among other components, a plurality of station multiplex/demultiplex circuits (referred to hereinafter as "SMXs") each responsive to a cluster of user ports, for concentrating the digital signal samples from each port (which include both bearer and signalling channels) into channel signals for exchange with the matrix switch.

The IDN is a digital, Pulse Code Modulated ("PCM") information handling system for voice, and simultaneous handling of data signal communication between IDN stations serviced by IDN station multiplexers.

All bearer information carried by the IDN, i.e. voice, data and signal information, are switched through the matrix for transmission through the system. This allows for flexibility in configuring IDN information paths. Also, multiple levels of multiplexing are used to combine station port signals into higher order multiplex signals for transmission to the IDN matrix. This occurs remotely from the central matrix and is flexible, allowing for selected installation of any number of station ports where needed.

The remote multiplexing for the IDN is performed by Channel Multiplexers ("CMXs") which form an integral part of the IDN system as depicted in FIG. 1 of the incorporated patent. The figure shows CMXs being utilized as part of line and trunk interfaces (units 117 and 140 respectively), and further shows the CMXs in close physical proximity to and tightly physically coupled (via a shared backplane) to the Central Equipment Module (CEM). This tight coupling of the transmission system and CEM is problematic where user stations, telephone company trunk demarcation blocks, etc. are distributed through a facility. Wiring costs, rigid configuration, system size and servicability are all negatively affected by a tight coupling of the transmission system to the CEM. Furthermore, it would be desirable if equipment used to interface a CEM with an SMX and/or trunk card, were modular and capable of being remotely located from the CEM. This would facilitate system expansion, changing user needs, etc., at a low cost.

It would also be desirable if voice, data and control signals could be interfaced between a CEM, and SMXs and trunk cards, via modular, Line Interface Modules ("LIMs") and Trunk Interface Modules ("TIMs") which rely to a large extent on processing power resident at the CEM, and even beyond the CEM in a host computer to which a CEM can be coupled. This would keep the cost and servicing requirements of LIMs and TIMs to a minimum and further enhance system reliability because of the multiple independent modules.

Such an architecture, conceptually a three (or higher) level architecture comprising (1) user station equipment, (2) LIMs, TIMs and a CEM, with possible nesting to form additional layers, and (3) external processing resources coupled to the CEM, would provide significantly greater equipment and processing resource distribution options, lower cost LIMs and TIMs (since processing resources could be concentrated at the CEM or beyond), etc., making for a truly integrated office control system. The aforementioned SMXs could conveniently be located in either of levels one or two. This system, to which the present invention is directed, is hereinafter referred to as an Integrated Office Controller (IOC).

The IOC will be recognized by those skilled in the art to significantly depart from the IDN's two level architecture which uses the tightly coupled hardware alluded to hereinbefore, for performing the LIM, TIM and CEM functions (one level) and for exchanging signals between SMX's, user ports and user equipment via the other "level". Furthermore, no external processing resources coupled to the CEM were contemplated as part of the IDN's architecture.

Further yet, the IOC will be recognized by those skilled in the art to depart from prior art systems such as AT&T's ESS number 5, NEC's 2400 and Intecom's IBX, where equipment that performs the LIM and TIM functions require the "intelligence" to perform the switching, concentration and processing functions that are decentralized to the CEM (and possibly further away from the user side of the CEM) in the IOC architecture.

SUMMARY OF THE INVENTION

The object of the current invention is to provide a communications system which is an integrated digital network having at least a three level architecture comprising user station equipment on one level; transmission equipment, including modular LIM and TIM equipment, together with the CEM, on a second level; and additional processing resources (e.g., an 88 k processor) on a third level. SMXs may conceptually be included in level one or level two. The entire integrated system constitutes the aforementioned IOC.

It is a further object of the invention to provide an IOC wherein the equipment for performing the CEM functions can be easily physically separated from modular equipment performing the aforementioned LIM and TIM functions. Achieving this object will reduce wiring costs, allow multiple economical system configurations and provide for ease in expanding the IOCs capabilities.

It is yet another object of the invention to locate the bulk of processing "intelligence" at the CEM or beyond (e.g., at a host computer) to keep the cost of the modular LIM and TIM elements to a minimum and to centralize call processing functions.

Furthermore, it is an object of the invention to be able to support more user functions than the prior art by introducing the host processor processing capabilities into the IOC and to allow for specialized switch operations to be programmed by the user via the host computer.

According to the present invention, an IOC network includes, in combination, a plurality of station devices, capable of transmitting and receiving multiplexed bearer and signal channel information; user port interface means for carrying said multiplexed bearer and signal channel information between a station device and a station multiplex/demultiplex device (SMX); a plurality of station multiplex/demultiplex devices (SMXs) each associated with and coupled to a predefined cluster of said station devices, via said user port interface means, for concentrating the multiplexed bearer and signal channel information, transmitted from a user port interface means toward said switch matrix, into channel signals, and for demultiplexing channel signals being transmitted toward the cluster of station devices coupled to a given SMX into multiplexed bearer and signal channel information for distribution to said station devices; transmission system means, capable of interfacing SMXs and trunk cards to a CEM, where SMX/CEM interfacing is performed by a modular LIM device and trunk/CEM interfacing is performed by a modular TIM device; call processor, system clock means and matrix switch means, located in the CEM device, for switching said channel signals; and host processing means, coupled to the CEM, for providing support for programmable applications that include voice and data integration within the IOC network The IOC, like the IDN, is a digital PCM information handling system for voice, and simultaneous handling of data signal communication between stations serviced by IOC station multiplexers.

Reduced wiring and equipment cost, configuration flexibility and expansion possibilities are realized via the provision for modular LIMs and TIMs in the IOC system. Further cost reduction in LIM and TIM equipment (and transmission equipment generally) are realized by concentrating switch intelligence (call processing functions, feature cards, etc.) at the CEM level.

Means for performing delay equalization to account for propagation delays between the CEM and remotely located equipment, are also substantively located at the CEM to keep processing tasks on the user side of the CEM to a minimum.

The IOC features simplified device access, station installation, call handling and PC integration, along with improved voice mail and electronic office capabilities, achieved by virtue of the processing resources included in, and structure of, the IOC system architecture.

These and other objects, features and advantages of the present invention will become more apparent to those skilled in the art in light of the following detailed description of the preferred embodiment of the invention, taken together with the accompanying Drawing.

DETAILED DESCRIPTION

Figure 1:
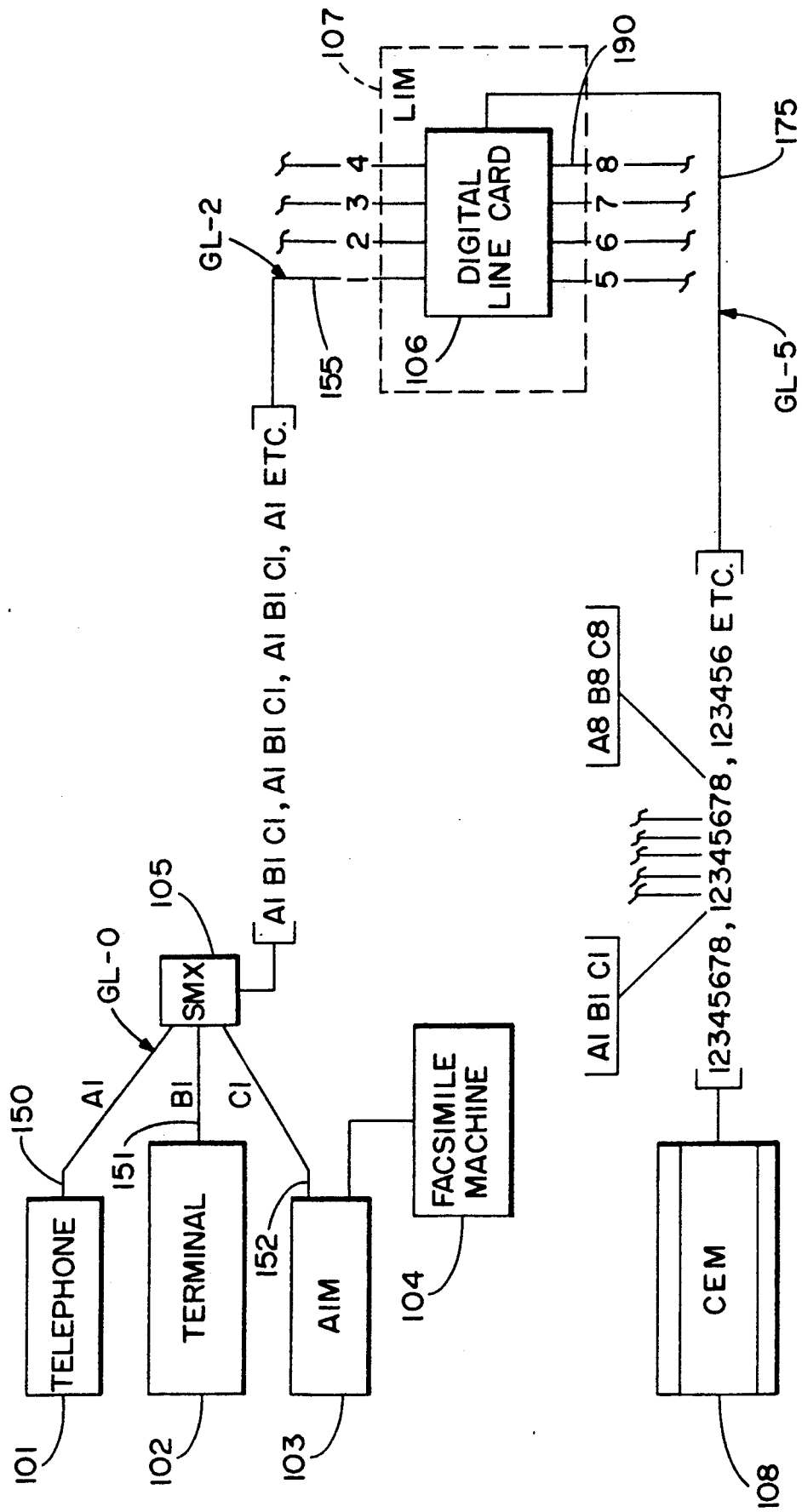
FIG. 1 depicts how IOC multiplexing takes place, in accordance with the preferred embodiment of the invention, utilizing the GL-0, GL-2 and GL-5 links described hereinafter.

A fundamental concept of the invention is the grouping of the IOC's hardware components into three basic groups: (1) station equipment; (2) an integrated office switching system (IOSS); and (3) a host computing resource.

Station equipment includes, for example, data terminals, digital telephone sets, PCs, and analog telephone interface equipment.

The IOSS portion of the IOC, according to the invention, includes three basic modules; (1) a central equipment module (CEM), (2) at least one line interface module (LIM) and (3) at least one trunk interface module.

As indicated hereinbefore, a key distinction between the IOC and the IDN, as taught in the incorporated patent, is the modularity of the IOC's IOSS. This allows for the physical separation and distribution of these modules which will be described in greater detail hereinafter.

The modular components in the IOC's IOSS allows it to be used with a variety of line sizes and applications. It can also be easily upgraded by, for example, adding selected ones of the aforementioned IOSS modules.

The preferred embodiment of the IOC also has two types of computer interface cards; a processor interface module (PIM-E) for interfacing the IOSS with the host computer resource, and a PC interface module (PIM-PC) for interfacing the IOSS with PC stations. These modules allow both synchronous and asynchronous communication between processors (PCs or host computers) and other IOC components. The interface modules convert the signal format on the data links (to be described hereinafter) connected to a given processor, into processor compatible signals (and vice versa since the interface is bidirectional). Speed buffering is also performed to match processor bus characteristics. Once the data link signal format and processor type is known, the conversion process is well within the knowledge of those skilled in the art and does not constitute a part of the invention per se. An example of a commercially available PIM-E is the Data General 4621 and a commercially available PIM-PC is the Data General 4617.

The host resources could, for example, be one of a number of computing resources such as Data General ECLIPSE MV/Family Computer, Motorola's 88000 chip set, etc. The type of host resource used is not intended to in any way limit the scope of the invention.

The host resource, which can be accessed by a low cost multiplexed interface (for example the GL-5 interface to be defined hereinafter) not part of the prior art IDN architecture, allows for user programming and performing a number of well known call management, electronic office and integrated voice and voice mail services.

Also fundamental to the understanding of the IOC is an explanation of the different types of digital transmission links used, in accordance with the preferred embodiment of the invention, to join the IOC components together. These links (three of them) correspond directly with certain of the IDN data links described in the referenced patent.

The first link, referenced to hereinafter as a GL-0 link, (corresponding to the Digital Signal Loop (DSL) described in the referenced patent), couples station equipment to a Station Multiplexer (SMX) which services a cluster of up to three stations. Each GL-0 link provides a station port with an 80 kbps full duplex data transmission link. Two twisted pairs of wire (standard telephone wiring) may be used to transmit the bit stream, with the power needed to operate the station equipment imposed on the signal.

The bit stream may be formatted according to well known practice (as taught in the IDN patent and elsewhere) as follows: (1) an 8 kbps signalling channel; (2) a 64 kbps bearer channel (for user selectable voice or data), and (3) an 8 kbps "E" channel, meaning "extra" or auxiliary data channel.

The 64 kbps bearer channel carries digitized voice when connected, e.g. to telephone equivalent, or data, when e.g. connected to a data terminal. The 8 kbps signalling channel carries event messages and commands such as: Off-Hook, On-Hook, Key Depressions, Ring, Turn on a Lamp, Raise Carrier Detect, etc.

The second type of link in the IOC hierarchy is referred to hereinafter as a GL-2 link. A GL-2 link is a 256 kbps full-duplex data transmission link that also uses 2 twisted-wire pairs. Each pair is used for transmission in one direction. The GL-2 may be used to connect LIMs and SMXs where, as indicated hereinbefore, each SMX is connected to station equipment.

According to the preferred embodiment of the invention, the GL-2 bit stream is formatted as follows: (1) an 8 kbps framing channel; (2) an 8 kbps X (auxiliary) channel; and (3) three 80 kbps data streams. The three 80 kbps data streams correspond to the three GL-0 streams.

The GL-2 may also be transmitted directly to a PIM-PC board associated, for example, with an IBM-compatible PC. The PIM-PC can use 192 kbps of the 256 kb/s for data transmission (both voice and text).

Finally, the third type of link in the IOC hierarchy is referred to hereinafter as a GL-5 link. The GL-5 link is a 2.048 mbps full-duplex data transmission link that uses 2 twisted-wire pairs. Each pair is used for transmission in one direction. GL-5s connect a CEM to other system components.

The bit stream is formatted as follows: (1) thirty-one 64 kbps bearer channels and (2) one 64 kbps framing channel which identifies the other 31 channels.

The 31 data streams can have different functions for different applications. According to the preferred embodiment of the invention, when connected to a LIM or a TIM, 24 of the data channels are used as bearer channels, and the rest are used for a variety of overhead and signalling functions associated with the bearer channels. When the GL-5 is connected to the host computer resource via a PIM-E card, 30 of the data streams are used as message channels, and 1 is used as a common control/signalling channel for the message traffic.

FIG. 1 recaps how multiplexing takes place in the IOC structure using the GL-0, GL-2 and GL-5 links defined hereinabove.

FIG. 1 depicts examples of station devices that form a part of a typical IOC network. FIG. 1 shows telephone station set 101, terminal device 102, and analog interface module (AIM) 103 coupling facsimile machine 104 to the rest of the IOC. An AIM simply converts the signal from a connected analog device to the aforementioned GL-0 signal format.

FIG. 1 also shows how GL-0 links 150, 151 and 152, carrying data signals A1, B1 and C1, are multiplexed between stations 101, 102 and 103/104, and SMX 105. These signals (A1, B1 and C1) are also shown multiplexed on GL-2 link 155 between SMX 105 and digital line card (DLC) 106, within LIM 107 (shown in dashed lines). According to the preferred embodiment of the invention, each LIM contains between 1 and 4 DLCs, where each DLC is the interface between 16 GL-2 links and 2 GL-5 links. For the sake of illustration only, FIG. 1 shows DLC 106 servicing 8 GL-2s and 1 GL-5. The GL-2 in FIG. 1 (link 155) is shown to repeat the multiplexed A1, B1, C1 pattern between SMX 105 and DLC 106.

Also depicted in FIG. 1 is GL-5 link 175 which serves as the interface between LIM 107 and CEM 108. The GL-5 is shown to carry the data from 8 GL-2s (labeled 1-8 and including GL-2 link 155) coupled to DLC 106 in LIM 107. The LIM and CEM will be described in detail hereinafter. The GL-5 link 175 is shown to multiplex signals A1, B1 and C1 (from GL-2 link 155) along with signals AX, BX, CX where X ranges from 2-8 and represents the three station signal sets, on each of the seven other GL-2 links coupled to DLC 106 (e.g., A8, B8 and C8 are from GL-2 link number 8, labeled 190). Thus GL-5 link 175 is shown to carry 24 bearer channels between LIM 107 and CEM 108 as indicated hereinbefore.

It is important to note that the hierarchical structure depicted in FIG. 1 parallels the IDN taught in the referenced patent. SMX 105 is functionally equivalent to a three input station multiplexer (an SMX3) and each DLC 106 in LIM 107 functions (at least in part) as a twenty four input (8 GL-2s with a 3 station capacity on each GL-2 link) channel multiplexer (a CMX24) as described in the referenced patent.

Since the multiplexing and signalling protocol taught in the referenced IDN patent is suitable for use with the IOC (in the context of the architecture set forth in FIG. 1) no further discussion of these protocols is necessary herein.

Figure 2:
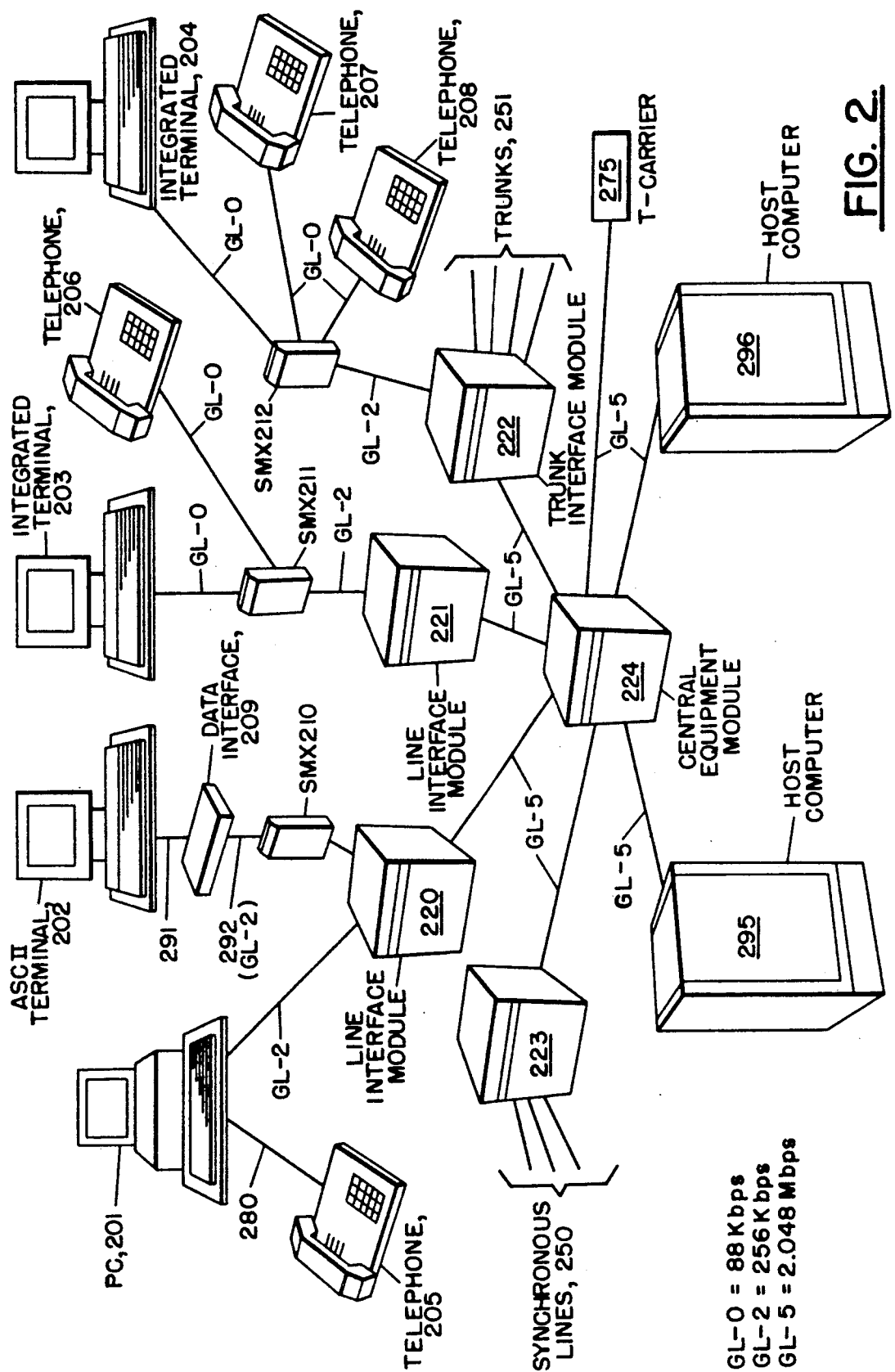
FIG. 2 is a high level representation of the IOC architecture, structured in accordance with the teachings of the invention, including a representation of the physically separated LIM, TIM and CEM components of the IOC.

FIG. 2 depicts a high level representation of the novel IOC architecture including the physically separated LIM, TIM and CEM components of the IOSS portion of the IOC.

Depicted in FIG. 2 are PC station 201; ASCII terminal 202; integrated terminals 203 and 204; and telephone sets 205, 206, 207 and 208, with set 205, coupled to PC 201 via link 280.

Also shown in FIG. 2 are SMX devices 210, 211 and 212 along with data interface 209, which allows terminal 202 to be coupled to the IOC via links 291 and 292.

Data interface 209 simply converts RS-232-C signals (e.g. from plotters, modems, ASCII terminals, etc.) into GL-0 format. Data interface 209 does not constitute a part of the invention per se. FIG. 2 also shows two LIMs, LIM 220 and LIM 221, TIM 222, (with trunks 251 coupled thereto), data interface module (DIM) 223 (an interface device, for coupling synchronous links 250 to the IOC, not constituting a part of the invention) and CEM 224. Also shown coupled to the IOC is t-carrier 275.

FIG. 2 goes on to show an IOC that includes at least one host computer resource. The host computer resource is an optional element of the IOC. The depicted computers, units 295 and 296, could, for example, be the 88 k microprocessor chip set referenced hereinbefore.

The GL-0, GL-2 and GL-5 links used to interconnect the components of the IOC depicted in FIG. 2 are each separately labelled.

It can be seen with reference to FIG. 2 that each SMX (like SMX 212) services up to three GL-0 links; that in the case of PC 201, A GL-2 link directly services the PC and telephone set 205; that the input to the LIM, DIM and TIM devices (from the station side of the network) is via GL-2 links; and that the interface between CEM 224 and all of the devices to which it may be coupled, occurs on GL-5 links.

The three level architecture of the IOC can also be seen with reference to FIG. 2.

The first level may be thought of as comprising units 201–212, the second level may be thought of as comprising units 220–224, and the third level may be thought of as comprising units 295 and 296. The exact demarcation point for each of the three levels could be relocated without departing from the scope or spirit of the invention, e.g., the SMXs (units 210–212) could be located in the second level instead of the first. It is important that the units and links comprising the first two levels be organized so that the first level includes the station equipment; the second level includes modular transmission equipment (like the modular LIM and TIM devices) together with the CEM; and that a host processing resourse, the third level, be coupled to the combination of the first two levels. This architecture gives the IOC the flexibility to integrate and handle a wide range of communications applications while keeping wiring costs to a minimum.

Figure 3:
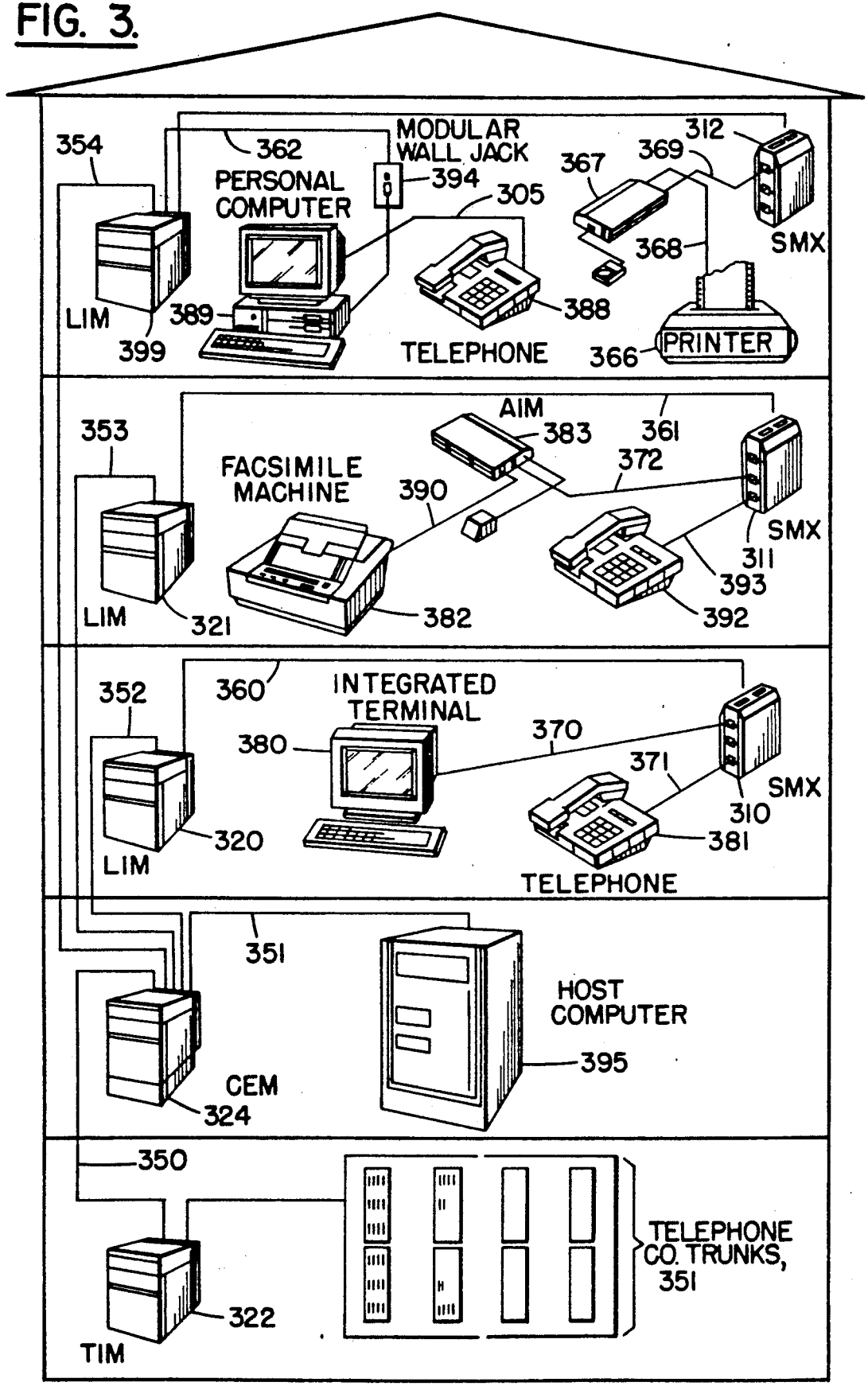
FIG. 3 depicts an example of IOC equipment distribution in a building.

FIG. 3 depicts an example of IOC equipment distribution in a building and illustrates the wiring cost advantages that can be achieved using the architecture described hereinbefore.

FIG. 3 shows telephone company trunks 351, usually coming into a building in the basement or ground floor, in close proximity to where a modular TIM, 322, can be located. Trunks 351 and TIM 322 are functionally equivalent to trunks 251 and TIM 222 of FIG. 2.

FIG. 3 goes on to show TIM 322 located separate and apart from CEM 324 and coupled to CEM 324 by GL-5 link 350. CEM 324 is shown, in this example, to be located on the next floor of the building and coupled (via GL-5 link 351) to host computer resource 395 located nearby on the second floor. CEM 324 and host computer 395 may be thought of as corresponding functionally to CEM 224 and host computer 295 from FIG. 2.

Next, CEM 324 is shown coupled to modular LIM devices 320, 321 and 399, distributed throughout the building on higher floors. The coupling is performed via GL-5 links 352, 353 and 354 respectively. Devices 320 and 321 may be thought of as corresponding functionally to devices such as LIM 220 and LIM 221 of FIG. 2

The station equipment side of the LIMs is shown in FIG. 3 to have GL-2 links coupled, via SMX devices 310, 311 and 312 and GL-0 links, to various types of station equipment. The SMXs correspond functionally to devices like SMX devices 210–212 of FIG. 2.

In particular, FIG. 3 shows LIM 320 coupled via GL-2 link 360 to SMX 310, which in turn is shown coupled to integrated terminal 303 (via GL-0 link 370) and to telephone set 381 (via GL-0 link 371).

LIM 321 is shown coupled via GL-2 link 361 and SMX 311, to facsimile machine 382 (via GL-0 link 372, AIM 383 and link 390. LIM 321 is also shown coupled to telephone set 392 via GL-2 link 361, SMX 311 and GL-0 link 393.

Finally, LIM 399 is shown with 2 GL-2 links on its station side, GL-2 links 362 and 363. GL-2 link 362 is shown coupled, via a modular wall jack 394, to personal computer 389. This corresponds functionally to the GL-2 link between devices 201 and 220 of FIG. 2. No GL-0 link is required. Telephone station set 388 may be coupled to the network via PC 389 and GL-0 link 305. The other GL-2 link coupled to LIM 399 (GL-2 link 363) is shown coupling printer 366 to the network via a data interface device (device 367 of FIG. 3), link 368, and GL-0 link 369.

What can be seen with reference to FIG. 3 is the ease with which additional modular LIMs, TIMs and CEMs can be added to the IOC since any required new devices can be located near the particular equipment being serviced or near equipment that is otherwise difficult to move.

Also, FIG. 3 illustrates that the "intelligence" of the IOC can be concentrated in one location (in the case of FIG. 3, on the second floor of the building) while relatively "dumb", relatively lower cost devices can be distributed where needed.

Figure 4:
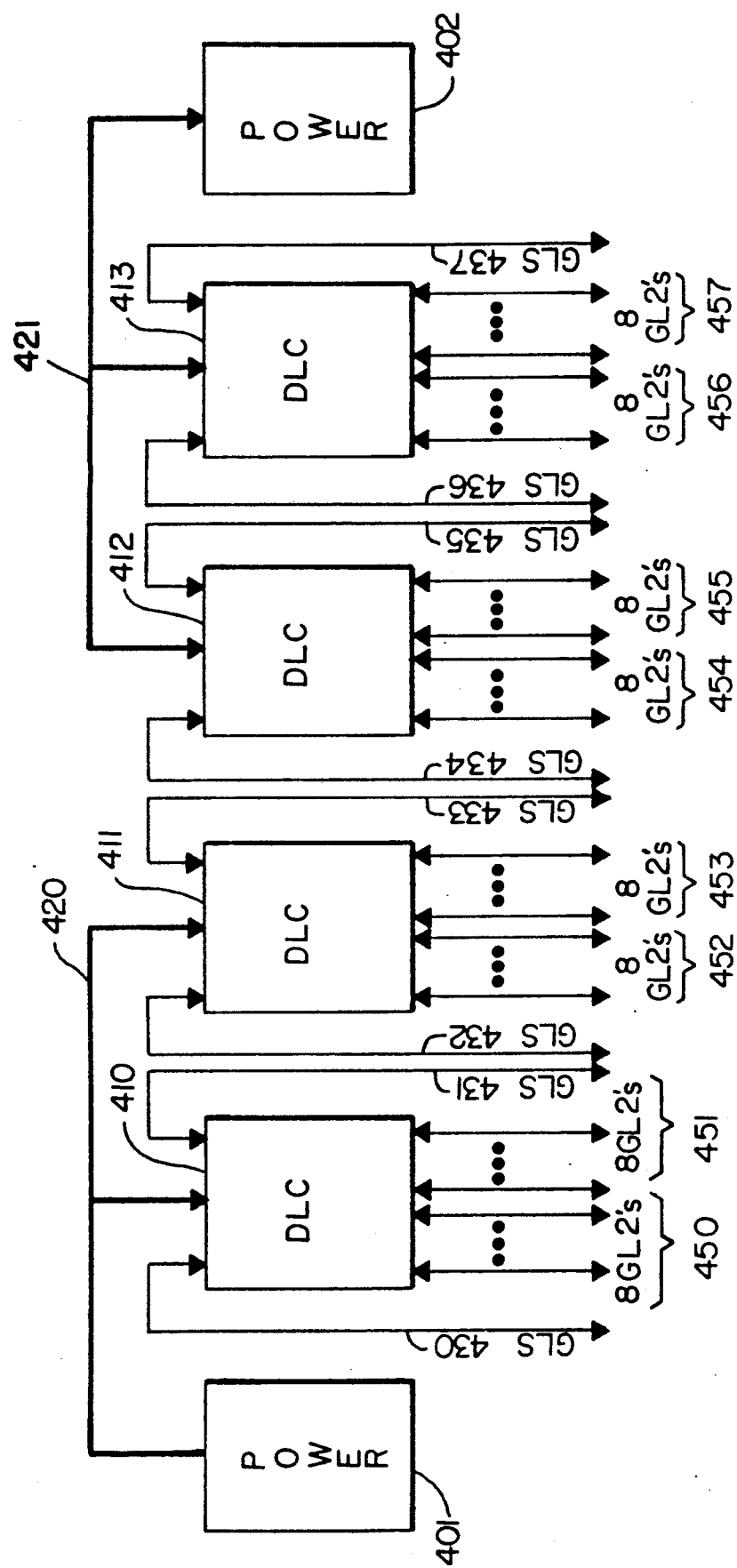
FIG. 4 is a block diagram of the modular LIM used in the preferred embodiment of the IOC.
Figure 5:
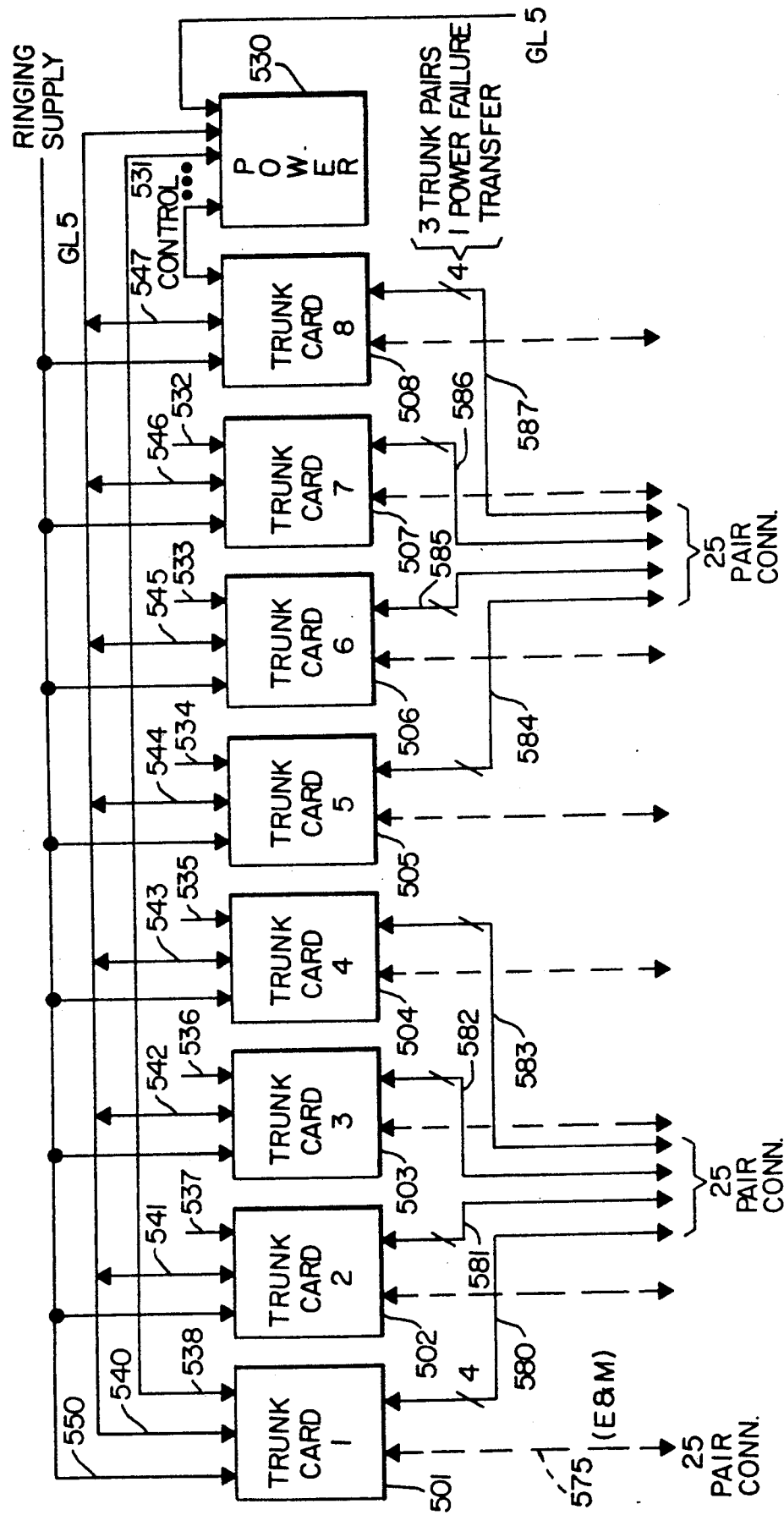
FIG. 5 is a block diagram of the modular TIM used in the preferred embodiment of the IOC.
Figure 6:
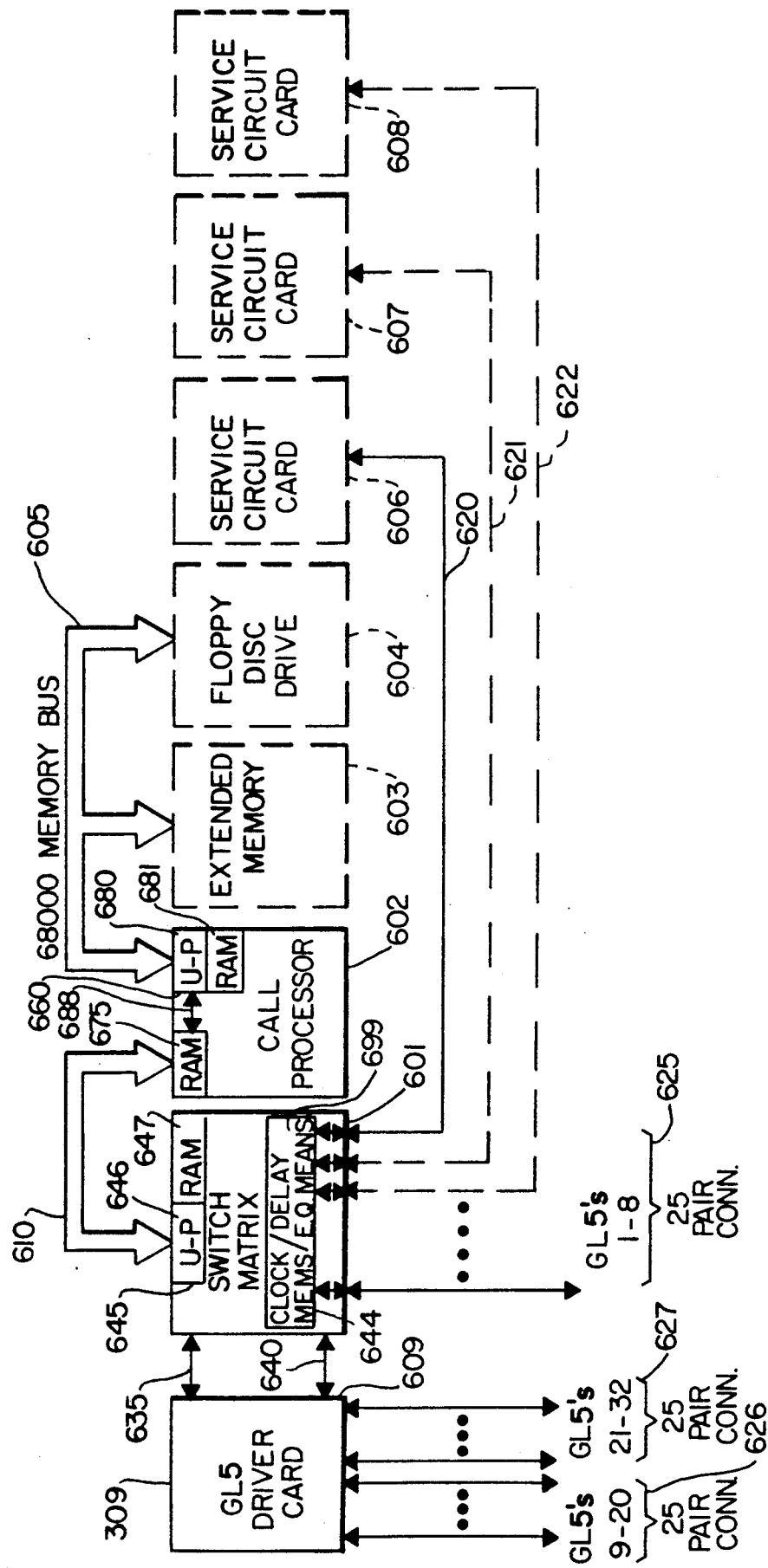
FIG. 6 is a block diagram of the modular CEM used in the preferred embodiment of the IOC.

The modularity of the LIM, TIM and CEM devices is what permits this flexibility. A block diagram illustrating the structure and function of each of these devices is shown in FIGS. 4–6. The following description will review the details of each of these devices and how they cooperate to form the novel, modular IOSS portion of the IOC.

FIG. 4 is a block diagram of the modular LIM used in the preferred embodiment of the invention.

The LIM multiplexes and demultiplexes signals between GL-5 and GL-2 links. The preferred embodiment of the LIM contains up to 4 digital line cards ("DLCs") which perform the multiplexing and demultiplexing. The preferred LIM also contains its own power supply. A power supply typically powers 2 DLCs. Each GL-5 can interface with up to 8 GL-2s. As each card can multiplex/demultiplex 2 GL-5s, each card is the source (or destination) for up to 16 GL-2s. Therefore, according to the illustrative embodiment of the invention, each LIM can support up to 64 GL-2s, enough for 192 stations.

FIG. 4 depicts the power supplies as units 401 and 402. The four DLCs are represented as units 410–413.

The power supplies are shown coupled to the DLCs via links 420 and 421. GL-5 links (430–437) are shown coupled by the DLCs to 8 sets (450–457) of GL-2 links (8 links per set). Each GL-5 link is coupled to 8 GL-2 links, for example, GL-5 432 is coupled to the set of 8 GL-2s labeled 452 in FIG. 4 via DLC 411. In this manner the up to 192 stations (3 up to per GL-2) can be coupled to the CEM.

It can be seen with reference to FIG. 4 that the LIM does not require any switch intelligence other then to perform its multiplexing/demultiplexing operations. This, according to the preferred embodiment of the invention, may be performed using well known hard-wired integrated circuitry. Prior art systems like ATT's ESS#5, NEC's 2400 and Intecom's IBX, have switching concentrators and processors in remote nodes to perform the function of the LIM. According to another aspect of the invention, the LIM is simply part of the transmission system and operates using only a twisted wire pair. This is in contrast to the LIM requiring a backplane signal which, for example, is required to perform the LIM function in the prior art IDN.

Accordingly, the novel modular LIM can be made at lower cost than the prior art equipment performing the LIM function, can be more easily located where desired, and can be easily serviced and maintained.

FIG. 5 is a block diagram of the modular TIM used in the preferred embodiment of the invention.

According to the preferred embodiment, the TIM can house up to 8 trunk circuit cards that convert from the IOC's digital format to standard analog format for transmission on the public network. The trunk cards are shown as units cards 501-508 in FIG. 4. The following are examples of well known trunk cards of which the TIM may be comprised: (1) Ground Start/Loop Start cards; (2) E & M trunks, (for tie lines to another switch or carrier equipment); (3) Off Premise Extensions (OPXs); and (4) Direct Inward Dial (DID) cards.

A TIM can have any mix of the above trunk types. Each of the 8 cards can have 3 circuits, so that each of the illustrative TIMs can link the IOC to as many as 24 trunks. This corresponds to GL-5's trunk interface capacity of 24 channels. Thus, each TIM serves as the interface of a GL-5 link and up to 24 trunks. This is illustrated in FIG. 5 by the coupling of GL-5 link 525 to the TIM via TIM power supply 530.

Power supply 530 is depicted as interconnected to each of the 8 trunk cards via links 531-538 of FIG. 5 (links 532-537 are indicated by "...." at the depicted power supply interface, and are separately labeled for the interface with a given trunk card). A reset control function for each card may be exercised via power supply 530 and links 531-538.

Link 540 of FIG. 5 is the bus that couples the GL-5 channels from power supply 530 to each of the depicted trunk cards. Links 541-547 are shown to tap bus 540. Each of links 541-547 supply 3 channels worth of data to a given trunk card.

FIG. 5 goes on to show ringing supply link 550, which can supply power for off premise extensions.

The remainder of FIG. 5 (the links shown below the trunk cards) represents a standard telephone interface for coupling the TIM to punch down blocks.

According to the preferred embodiment of the invention, each E&M trunk interface (illustrated by dashed links, like link 575) can be coupled to the TIM via a 25 pair connector. Non E&M interfaces (shown in solid lines) can use one 25 pair connector for up to four trunk cards where each card has 3 trunk pairs (6 wires times 4, or 24 wires) and one power failure transfer line (per bank of 4 cards) coupled to each 25 pair connector (25 wires in and 25 wires out). This is illustrated in FIG. 5 by links 580-583 for trunk cards 501-504, and by links 584-587 for trunk cards 505-508.

Like the LIM the TIM is modular and performs multiplexing/demultiplexing operations. The preferred embodiment of the TIM uses a microprocessor on each of the trunk cards to perform this function. Also, in contrast to the IDN, the TIM is not directly connected to the switching matrix backplane.

The other key modular component of the IOC is the CEM. FIG. 6 depicts the CEM to be comprised of switch matrix 601; call processor 602; extended memory 603 and floppy disk drive 604 (units 603 and 604 being associated with call processor 602 and coupled thereto via memory bus 605); at least one service circuit card, 606; optional service circuit cards 607 and 608; and GL-5 driver card 609. Not shown in FIG. 6, but included in the CEM in one embodiment of the invention, is a self contained power supply.

According to the preferred embodiment of the invention, switch matrix 601 is a digital time-division switching matrix that provides totally non-blocking switching between up to 32 GL-5 links, each having a 32 channel capacity. Accordingly, the switch can handle up to 1024 channels.

Switch matrix card 601 performs the same switching function as the switching matrix described in the IDN patent, except that the IOC switching matrix is a larger capacity switch.

According to the preferred embodiment of the invention, switch matrix card 601 includes a switch matrix clock (shown as clock means 644 in FIG. 6) and a 68K microcomputer (shown as microcomputer 645 in FIG. 6) that functions primarily as a switch controller. Clock means 644 of FIG. 6 is shown combined (coupled) with associated delay equalization means 699, the purpose of which is explained hereinafter. Clock means 644 and delay equalization means 699 are shown coupled to (1) the GL-5 links on interface 625 shown in FIG. 6, and (2) any service circuit cards (e.g., cards 606-608 of FIG. 6) coupled to switch matrix card 601 (e.g., via links 620-622 of FIG. 6). Clock means 644 drives the outgoing links (outgoing from card 601), and delay equalization means 699 service the incoming links. Microcomputer 645 of FIG. 6 is shown to include microprocessor 646 and the illustrative 68K of random access memory (RAM) 647. Microcomputer 645, in addition to functioning as a switch controller, can also be used to perform user defined processing tasks in a manner that reduces loads typically placed on the call processor. The microcomputer on card 601 can therefore be used to speed up system operation in addition to performing switching per se.

Call processor card 602, to be described in detail hereinafter, also includes a 68K based microcomputer (shown as microcomputer 660 in FIG. 6) which shares memory space with microcomputer 645 on switch matrix card 601. This is depicted as taking place over dual port memory access means (bus 610) shown in FIG. 6. The shared memory is typically RAM located on either of cards 601 or 602 and is shown on card 602, for the sake of illustration only, of FIG. 6 at 675. It should be noted that microcomputer 660 has its own microprocessor and RAM, shown at 680 and 681 of FIG. 6 respectively, and that microprocessors 645 and 680 can both communicate with each other (and with shared RAM 670) via bus 610 and link 688, respectively.

Switch matrix 601 can be used to interface 8 external GL-5s that are connected to punch-down blocks via a 25 pair cable. This is depicted in FIG. 6 as the 625 interface. The cable can be connected to the card with a 50-pin amphenol plug. These GL-5s can then be distributed to service cards (to be described hereinafter), TIMs, LIMs, and PIM-Es.

To interface more than 8 GL-5s the invention allows for the inclusion of an optional GL-5 driver card, shown coupled to card 602 via links 635 and 640, which may be used to interface another 24 GL-5 digital signals, bringing the system total to 32. These data links are connected to the punch-down blocks via two 25-pair cables, shown as 626 and 627 in FIG. 6.

Call processor card 602 interprets user requests and in contrast to the IDN may communicate with the host computer. The call processor function is similar to that of the IDN call processor. The memory of call processor 602 (RAM 681) may be extended by, for example, an extended memory card, such as unit 603 shown in FIG. 6, and by an optional floppy disk drive (card 604 of FIG. 4).

Floppy disk controller card 604, which may be realized by using a small 3½ inch disk drive, may be used to locally store call processing code and an IOC data base. This data base typically carries system configuration information and is loaded at the time the IOC is initialized.

According to the preferred embodiment of the invention, up to three service cards may be installed in a CEM, and each service card has eight service circuits. These circuits can be configured to provide the appropriate mix of functions like conferencing, DTMF Tone Generation, DTMF Tone Reception, ASCII Character Generation, Link Analysis and asynchronous terminal interfacing.

The function of each circuit card can be varied by down loading defined functions from the data base. This is indicated in FIG. 6 by GL-5 lines 620-622 between service circuit cards 606-608 and call processor 602 (coupled via switch matrix 601). More particularly, a control channel within each of the aforesaid GL-5 lines is used to carry download information from the data base.

Finally, according to the preferred embodiment of the invention, included in switch matrix card 601 of FIG. 6 are means for accounting for the propagation delays between the CEM and each unit to which the CEM may be coupled. Such means are depicted in FIG. 6 as the previously reference delay equalization means (699) and, like clock means 644, are shown coupled to (1) the GL-5 links on interface 625 and (2) any service circuit cards attached to switch matrix card 601. Any one of a number of well known techniques and circuits may be used for this purpose, for example, an elastic store combined with metastability filters and a digital phase locked loop, (all driven by the switch matrix clock and received data). Conceptually, the delay equalization means does not need to be located entirely within the CEM. What is important is that the delay equalization function be performed when coupling the CEM to remotely located devices.

What has been described is an integrated office controller that meets all of the objectives set forth hereinbefore. Those skilled in the art will recognize that the foregoing description of a preferred embodiment of the novel methods and apparatus has been presented for the purposes of illustration and description only. It is not intended to be exhaustive or to limit the invention to the precise form disclosed, and obviously many modifications and variations are possible in light of the above teaching.

Special integration features can be realized utilizing the system described herein when utilized in combination with a commercially available electronic office system, such as the CEO system from Data General (a registered trademark of Data General Corporation). These features are a direct result of being able to link voice and data in the same system. Applications that those skilled in the art will recognize as realizable in such a system include the ability to turn a data terminal into a tool for handling voice communication, applications that digitize voice messages for storage in host computer data files so that "voice files" can be retrieved in the same manner as electronic mail; and applications that involve the integration of an attendant work station (e.g., an IBM-PC compatible with an attendant keyset) with the electronic office system to allow rapid switching between the office system and attendant functions. The inclusion of the "third level" host processing resource in the IOC gives it the processing power to implement these and other desirable features; while the IOC's modular architecture makes the system relatively easy to install at minimum wiring cost, and be flexibly configured.

The embodiment and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. An integrated office controller (IOC) network for exchanging bearer and channel signal information between user station devices via a switch matrix, comprising:
  (a) a plurality of station devices for transmitting and receiving multiplexed bearer and signal channel information;
  (b) user port interface means for carrying said multiplexed bearer and signal channel information between at least one of said station devices and a station multiplex/demultiplex (SMX) device;
  (c) a plurality of station multiplex/demultiplex devices (SMXs), each associated with and coupled to a predefined cluster of said station devices via user port interface means, wherein each SMX is operative to concentrate multiplexed bearer and signal channel information received from said user port interface means into channel signals and to transmit said channel signals toward said switch matrix over a transmission system, and further wherein each SMX is operative to demultiplex channel signals being transmitted toward a cluster of station devices, via said transmission system, into multiplexed bearer and signal channel information for distribution to said station devices via said user port interface means;
  (d) a transmission system, including at least one modular line interface device (LIM), for interconnecting a set of SMX devices, via said LIM, with a separate modular central equipment device (CEM), wherein said transmission system is operative independent of the backplane of said CEM to multiplex the channel signals transmitted by said set of SMXs into multiplexed switch matrix channel signals and to transmit said multiplexed switch matrix channel signals toward said CEM, and further wherein said transmission system is operative independent of the backplane of said CEM to demultiplex multiplexed switch matrix channel signals received from said CEM into channel signals for distribution to said set of SMXs; and (e) modular central equipment means (CEM), including a call processor, a switch matrix directly coupled to said transmission system, and clock means, for receiving multiplexed switch matrix channel signals from said transmission system, for switching said multiplexed switch matrix channel signals through said switch matrix under the control of said call processor and clock means, and for transmitting switch matrix output, in the form of multiplexed switch matrix channel signals, toward said set of SMX's via said transmission system, thereby providing a continuous path by which user station devices may exchange bearer and channel signal information via said switch matrix using a transmission system that is directly coupled to said switch matrix and operates independent of said CEM backplane.

2. An IOC network as set forth in claim 1 wherein said transmission system further comprises at least one modular trunk interface device (TIM), for interconnecting a plurality of telephone trunks, each carrying trunk channel signals, to said CEM via a plurality of trunk cards.

3. An IOC network as set forth in claim 2 wherein each of said trunk cards comprise means for multiplexing and outputting to said CEM, said trunk channel signals as multiplexed switch matrix channel signals for exchange via said switch matrix.

4. An IOC network as set forth in claim 3 wherein each of said trunk cards further comprise means for demultiplexing multiplexed switch matrix channel signals received from said CEM, into trunk channel signals for distribution to said trunks.

5. An IOC network as set forth in claim 4 wherein each of said TIMs further comprise a self contained power supply.

6. An IOC network as set forth in claim 1 wherein each of said LIMs comprise a plurality of digital line cards, each of which includes processing means for multiplexing received channel signals into multiplexed switch matrix channel signals, and demultiplexing received multiplexed switch matrix channel signals into channel signals.

7. An IOC network as set forth in claim 6 wherein each of said LIMs further comprise a self contained power supply.

8. An IOC network as set forth in claim 1 wherein said CEM further comprises switch matrix processing means, including memory means, which controls the operation of said switch matrix independent of said call processor.

9. An IOC network as set forth in claim 8 wherein said CEM further comprises dual port memory access means for allowing said memory means to be shared with said call processor.

10. An IOC network as set forth in claim 9 wherein said CEM further comprises means, coupled to said call processor, for extending call processor memory space.

11. An IOC network as set forth in claim 10 wherein said CEM further comprises means for storing call processing code and a predefined IOC data base and means for coupling said data base, to said call processor.

12. An IOC network as set forth in claim 11 further comprising at least one service circuit card, coupled to said switch matrix processing means, wherein said service circuit card may be programmed via said switch matrix processing means to perform any one of a set of down loadable functions, the definitions of which are stored in said data base, accessable to said switch matrix processing means via said shared memory means, said call processor and said means for coupling said data base to said call processor.

13. An IOC network as set forth in claim 8 wherein said CEM further comprises delay equalization means, coupled to said clock means, operative to compensate for data propagation delays occurring whenever the CEM is coupled to a remotely located device in the network.

14. An Integrated Office Controller (IOC) network comprising:
(a) a plurality of user station devices for transmitting and receiving bearer and signal channel information; and
(b) means for coupling said plurality of user station devices to a switch matrix located in a modular central equipment (CEM) device, wherein said means for coupling includes a transmission system comprised of a modular components that operate independent of the CEM backplane and couple said bearer and signal channel information, in multiplexed form, directly to the switch matrix portion of said CEM for switching.

15. An IOC network as set forth in claim 14 further comprising host processor resource means, coupled to said CEM, for providing support for user programmable applications that include voice and data integration within the IOC network.

16. An IOC network as set forth in claim 15 wherein said transmission system further comprises modular means that operate independent of the CEM backplane and couple signal channels on telephone trunks connected to the IOC to said CEM.

17. An IOC network as set forth in claim 14 wherein said CEM further comprises means for performing delay equalization to compensate for propagation delays occurring in said transmission system.

18. A modular link interface device (LIM) for use in a digital communication system to interconnect each of a plurality of station multiplex/demultiplex (SMX) devices, each of which outputs channel signals representing bearer and channel information signals being exchanged between a plurality of user stations via a switch matrix, to a modular central equipment (CEM) device that is operative to switch multiplexed channel signals via said switch, comprising:
(a) a self contained power source;
(b) means for receiving channel signals output from said plurality of SMXs;
(c) means for coupling received channel signals to a plurality of digital line cards;
(d) a plurality of digital line cards, each of which includes means for multiplexing received channel signals for transmission to said CEM for switching via said switch matrix; and
(e) means for directly transmitting said multiplexed channel signals to the switch matrix portion of said CEM independent of the CEM backplane.

19. A LIM as set forth in claim 18 further comprising:
(a) means for directly receiving switched multiplexed channel signals output from the switch matrix portion of said CEM independent of the CEM backplane;

(b) means, included on said plurality of line cards, for demultiplexing multiplexed switch channel signals received from said CEM into channel signals for distribution to said plurality of SMXs; and (c) means for distributing channel signals to said plurality of SMXs.

20. A modular trunk interface device (TIM) for use in a digital communication system to interconnect a plurality of trunk circuits, each of which contain trunk channel signals that comprise bearer and channel information signals being exchanged with a plurality of user stations via a switch matrix, with a modular central equipment (CEM) device that is operative to switch trunk channel signals via said switch matrix, comprising:

(a) a self contained power source;

(b) means for receiving trunk channel signals carried on said plurality of trunk circuits;

(c) means for coupling received trunk channel signals to a plurality of trunk circuit cards;

(d) a plurality of trunk circuit cards, each of which includes means for multiplexing received trunk channel signals into multiplexed switch matrix channel signals for transmission to said CEM for switching via said switch matrix; and (e) means for directly transmitting said multiplexed switch matrix channel signals to the switch matrix portion of said CEM independent of the CEM backplane.

21. A TIM as set forth in claim 20 further comprising:

(a) means for directly receiving multiplexed switch matrix channel signals output from said CEM independent of the CEM backplane;

(b) means, included on said plurality of trunk circuit cards, for demultiplexing multiplexed switch matrix channel signals received from said CEM into trunk channel signals for distribution to said plurality of trunk circuits; and (c) means for distributing trunk channel signals to said plurality of trunk circuits.

22. An integrated office controller (IOC) network for exchanging bearer and channel signal information between user station devices via a switch matrix, comprising:

(a) a plurality of station devices for transmitting and receiving multiplexed bearer and signal channel information;

(b) user port interface means for carrying said multiplexed bearer and signal channel information between at least one of said station devices and a station multiplex/demultiplex (SMX) device;

(c) a plurality of station multiplex/demultiplex devices (SMXs), each associated with and coupled to a predefined cluster of said station devices via user port interface means, wherein each SMX is operative to concentrate multiplexed bearer and signal channel information received from said user port interface means into channel signals and to transmit said channel signals toward said switch matrix over a transmission system, and further wherein each SMX is operative to demultiplex channel signals being transmitted toward a cluster of station devices, via said transmission system, into multiplexed bearer and signal channel information for distribution to said station devices via said user port interface means;

(d) a transmission system, including at least one modular line interface device (LIM), for interconnecting a set of SMX devices, via said LIM, with a separate modular central equipment device (CEM), wherein said transmission system is operative to multiplex the channel signals transmitted by said set of SMXs into multiplexed switch matrix channel signals and to transmit said multiplexed switch matrix channel signals toward said CEM, and further wherein said transmission system is operative to demultiplex multiplexed switch matrix channel signals received from said CEM into channel signals for distribution to said st of SMXs;

(e) modular central equipment means (CEM), coupled to said transmission system, including a call processor, a switch matrix and clock means, for receiving multiplexed switch matrix channel signals from said transmission system, for switching said multiplexed switch matrix channel signals through said switch matrix under the control of said call processor and clock means, and for transmitting switch matrix output, in the form of multiplexed switch matrix channel signals, toward said set of SMX's via said transmission system, thereby providing a continuous path by which user station devices may exchange bearer and channel signal information via said switch matrix; and (f) host processor resource means, capable of coordinating with but being operated independently with respect to said call processor, coupled to said CEM, for providing support for user programmable applications that include voice and data integration within the IOC network.

23. An IOC network as set forth in claim 22 wherein the operation of the components of said transmission system is independent with respect to a CEM backplane.

* * * * *